April 13, 1948. O. A. KRAUER 2,439,608
ELEVATOR LOAD WEIGHING APPARATUS
Filed Sept. 8, 1943 2 Sheets-Sheet 2

Otto Albert Krauer INVENTOR
BY Walter T. Bradley ATTORNEY

Patented Apr. 13, 1948

2,439,608

UNITED STATES PATENT OFFICE 2,439,608

ELEVATOR LOAD WEIGHING APPARATUS

Otto Albert Krauer, Yonkers, N. Y., assignor to Otis Elevator Company, New York, N. Y., a corporation of New Jersey Application September 8, 1943, Serial No. 501,730

11 Claims. (Cl. 187—29)

1

The present invention relates to the measuring of the load in elevator cars and to the utilization of the measurement thus obtained.

It is desirable in many elevator installations to measure the load carried by the elevator car. Such load measurement may be utilized for various purposes, such as regulating the speed of the elevator hoisting motor or controlling the operation of the motor to obtain accurate stopping of the car at the landings.

The principal object of the invention is to provide an arrangement for accurately measuring the load in an elevator car.

The invention involves a variable impedance arranged at a point between the hoisting ropes and the car platform and so that as the load in the car changes the value of the impedance changes.

The invention will be described as applied to an installation in which the car platform is supported on elastic means between the platform and the lower cross structure of the car framework. With such support, the distance between the car platform and this cross structure varies in accordance with change in load in the car. In carrying out the invention as applied to such an installation, the impedance is carried by the car and mechanism is provided which is operated when the distance between the car platform and this cross structure changes to vary the impedance in accordance with the change. Thus the impedance is varied in accordance with variations in load in the car. These changes in impedance are utilized to control an electroresponsive device. The value of the voltage applied to this device is dependent upon the value of the impedance. An arrangement is included for varying this voltage so as to effect operation of the electroresponsive device for different impedance values. In the arrangement illustrated the impedance is connected in one leg of a Wheatstone bridge so as to provide an unbalance of the bridge which varies with variations in load in the car. This unbalanced voltage is combined with a variable potentiometer voltage to provide a definite firing voltage for an electron tube. The amount of movement of the potentiometer movable element to effect the firing of the tube is a measurement of the load in the car and this measurement may be utilized for controlling the operation of the car or for any other desired purpose.

Features and advantages of the invention will be apparent from the above statements, the description which follows, and appended claims.

2

Figure 1:
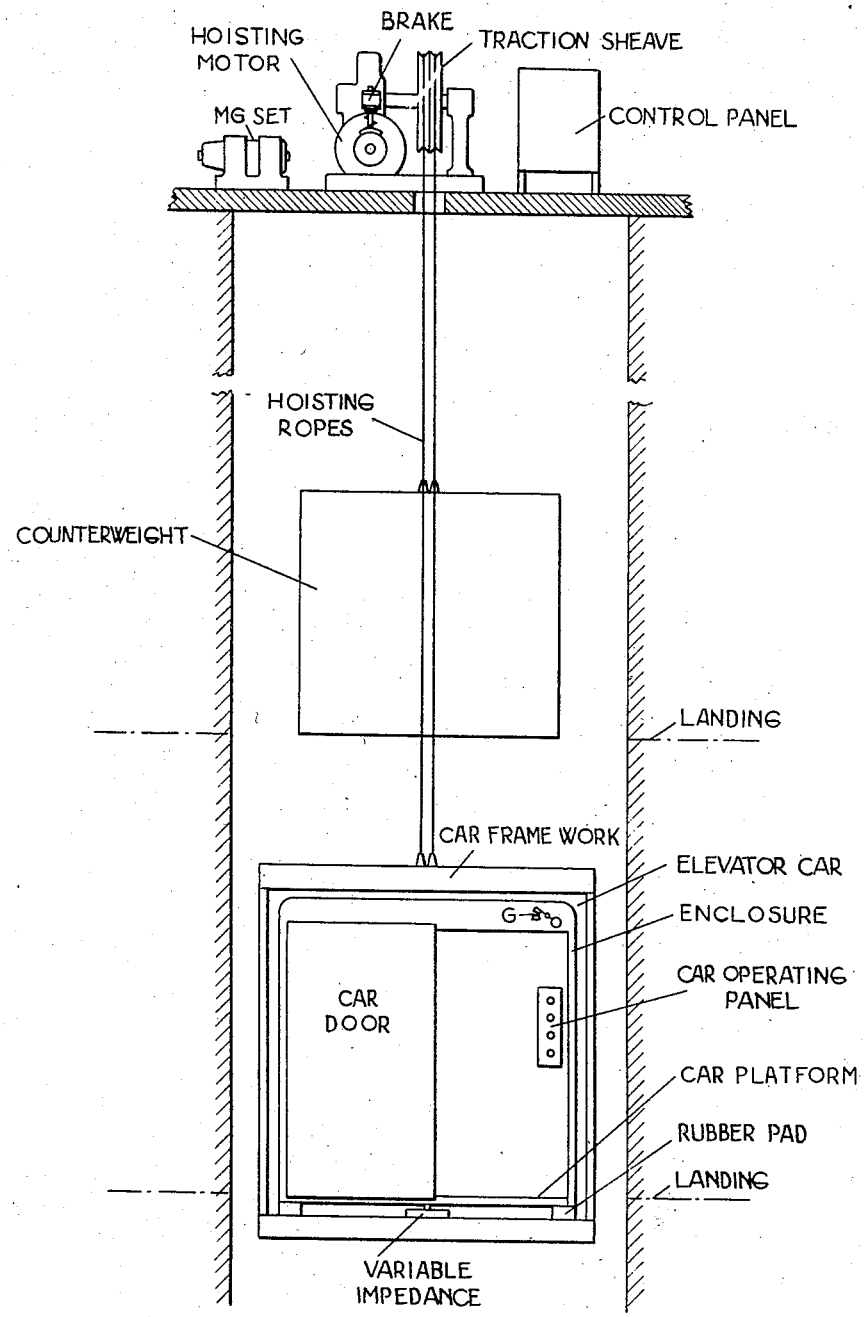
Figure 1 is a simplified schematic representation of an elevator installation embodying the invention.

Referring first to Figure 1, wherein the various parts are indicated by legend, the elevator car is suspended by hoisting ropes which extend upwardly from the car framework around the traction sheave and downwardly to the counterweight. A geared machine is illustrated in which the traction sheave is driven by the hoisting motor through a worm and worm gear reduction. A motor generator set is illustrated for supplying power to the motor. The brake is electromechanical, being spring applied and electromagnetically released. Push buttons are illustrated in the car on a car operating panel as a means for controlling the operation of the car. The car is provided with a door which, upon reaching closed position, closes contacts G. The various electromagnetic switches employed in the circuits are arranged on the control panel.

The car framework carries the car enclosure and car platform. Rubber pads are arranged between the platform and the lower cross structure of the framework as for example as disclosed in the patent to Hymans No. 2,246,732. In the Hymans patent, rubber pads are provided to render negligible the transmission of vibration to the elevator cab, i. e., the car enclosure and platform, and such arrangement is especially suitable for the present invention because it not only takes care of the vibrations but also provides a support for the car platform in which the distance between the platform and the lower cross structure varies with variations in load in the car. A variable impedance is mounted on the lower cross structure between it and the car platform and arranged so that the value of the impedance is varied as variations in the distance between the cross structure and platform takes place, thereby weighing the load.

Figure 2:
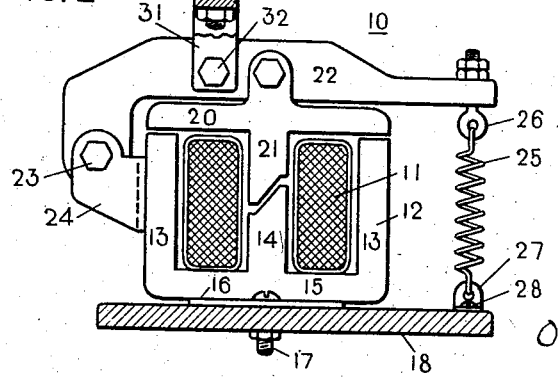
Figure 2 is a side view, with parts in section, of a variable impedance employed in the system illustrated in Figure 1.

Referring now to Figure 2, the impedance is illustrated as an inductive reactance. This reactance is in the form of an electromagnet 10 having a variable air gap. The electromagnet comprises a coil 11 mounted on a frame 12. The frame comprises a pair of legs 13 and a central core 14, all extending from a base 15. The base has ears 16 formed thereon which bolts 17 extend to mount the electromagnet on a plate 18 secured to the lower cross members of the car framework.

The coil 11 is positioned on the stationary core 14 between the legs 13. An armature 20 spans the legs and is provided centrally with a core 21 for cooperating with stationary core 14. The armature is clamped to a lever 22 pivotally mounted on a pivot bolt 23 supported by lugs 24 extending from one of the legs 13. The armature is biased to attracted position with respect to the frame by a spring 25. This spring is adjustably secured at one end to the outer end of lever 22 by an eye bolt 26. At its other end it is secured to plate 18 by an angle 27, in turn secured to the plate by a screw 28.

The lever 22 is connected to the car platform 30 through a U-shaped link 31 pivotally connected to the lever by a bolt 32. A connecting bolt 33 is adjustably secured to the yoke 34 of the link. The head 35 of this bolt is retained in a housing 36 secured to the platform as by screws 37. The underside of the head 35 is formed to provide a convex surface which fits in a concave surface formed in the bottom of the housing to provide a swivel joint.

In operation, as the load in the car increases, the distance between the car platform and plate 18 decreases. As a result lever 22 is moved clockwise about its pivot to decrease the air gap between armature 20 and frame 12. When the load in the car decreases, the distance between the platform and the plate increases pulling lever 22 counterclockwise about its pivot. This increases the air gap between the armature and the magnet frame. The decrease in air gap decreases the reluctance of the magnetic circuit and thus increases the inductance of magnet coil 11, whereas an increase in the air gap increases the reluctance of the magnetic circuit and thus decreases the inductance of the coil. Thus the electromagnet serves as a variable inductor, hereinafter designated L.

Figure 3:
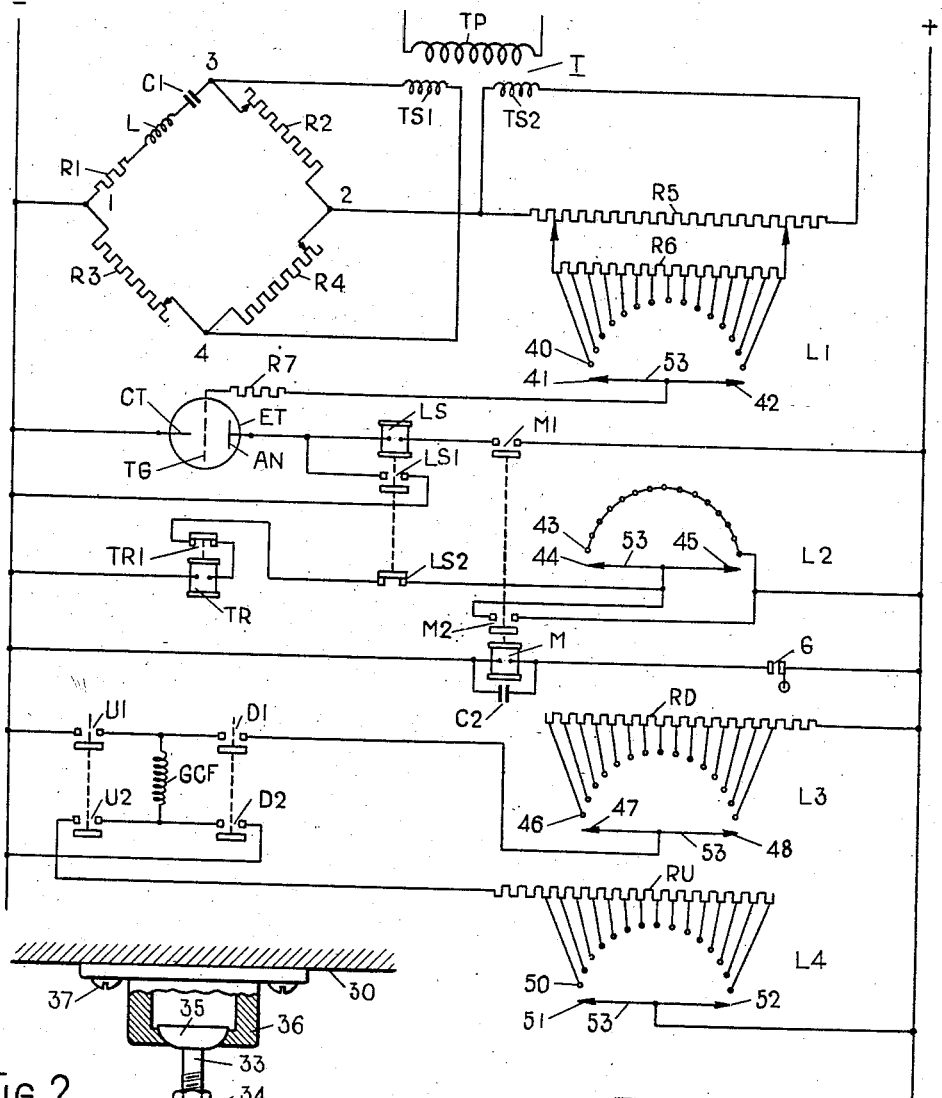
Figure 3 is a simplified wiring diagram of an arrangement of circuits utilizing the variable impedance in an elevator system.

Referring now to Figure 3, the load measurement obtained through the variation of the inductance of inductor L is utilized to compensate for these load variations by varying the strength of a compensating field winding GCF provided on the variable voltage generator which supplies power to the elevator hoisting motor. Of the motor-generator circuits, only the compensating field winding circuits are shown. Preferably, no series field winding is provided on the generator inasmuch as the compensating field winding serves to compensate for load, although both these field windings may be provided, one supplementing the other. Resistance RD is for controlling the strength of compensating field winding GCF for down car travel while resistance RU is for controlling the strength of this field for up car travel. Only the circuits relating to the load measuring apparatus are shown in Figure 3, it being understood that these circuits may be embodied in various elevator control systems and arranged to suit the requirements of the particular installation.

The inductor L is illustrated as arranged in one leg 1—3 of a Wheatstone bridge. Resistance R1 is connected in series with inductance L in leg 1—3. The other legs of the bridge comprise adjustable resistances R2, R3 and R4. Voltage is applied across one diagonal of the bridge at points 3 and 4 by the secondary winding TS1 of a transformer T. The primary winding TP of this transformer is connected across alternating current supply lines, as for example the supply lines for the driving motor for the generator of the motor generator set. The voltage across the other diagonal of the bridge between points 1 and 2 is utilized to control the firing of a cold cathode tube ET. The cathode of this tube is designated CT, the anode AN, and the auxiliary anode or trigger TG. Supplementing the voltage due to any unbalance of the bridge is the voltage of another secondary winding TS2 of transformer T. A potentiometer resistance R6 is utilized to control the value of the voltage provided by transformer secondary winding TS2. This is effected by arranging resistance R6 in a plurality of adjustable steps. These steps are connected to stationary contacts 40 adapted to be successively engaged by one or the other of brushes 41, 42 to provide a variable potentiometer output voltage. One end of the potentiometer resistance is connected to point 2 of the bridge while the brushes are connected through resistance R7 to the trigger of the tube. The polarity of connections is such that the potentiometer output voltage adds to the voltage drop across diagonal 1—2. To enable adjustment of the overall value of voltage drop across resistance R6, this resistance is adjustably connected at each end to a second resistance R5, in turn connected across the secondary winding TS2. Thus, the circuit for firing the tube is front point 1 to point 2 of the bridge, through a portion of the potentiometer resistance, depending upon the amount of bridge unbalance, resistance R7, trigger TG and cathode CT back to point 1.

A rotary type notching relay is utilized to move brushes 41 and 42 over contacts 40. The tripping coil of the notching relay is designated TR and the contacts of the relay which break the circuit for each notching operation are designated TR1. The notching relay is arranged in four levels designated L1, L2, L3 and L4. Level 1 comprises the stationary contacts 40 and brushes 41 and 42. Level L2 comprises a plurality of connected stationary contacts 43 adapted to be engaged by brushes 44 and 45. This leved controls the tripping coil to effect the resetting of the relay. The other levels L3 and L4 are similar to level L1. Level L3 comprises a plurality of stationary contacts 46 connected to adjustable portions of resistance RD and adapted to be engaged by brushes 47 and 48. Similarly level L4 comprises a plurality of stationary contacts 50 connected to adjustable portions of resistance RU and adapted to be engaged by brushes 51 and 52. The stationary contacts of levels L1, L2, L3 and L4 are all arranged in an arc of a circle. The extent of the arc is the same for each level and is less than 180°. The brushes of each level however are spaced 180°. The circuits are arranged to position both brushes of each level in a neutral position disengaged from their stationary contacts when the car is stopped, this being the position of the brushes illustrated in Figure 3. The brushes are mounted on operating arms 53 and these operating arms are mounted on a common operating shaft so as to move in unison. The operating arms are always rotated clockwise with the result that due to the spacing of the brushes, the brushes of each level are alternately effective and the effective brush serves for only half a revolution.

A switch LS has its coil connected in circuit with tube ET to be operated when the tube fires to stop further rotary movement of the notching relay. Another switch M is provided which is operated when contacts G close. Condenser C2 is connected across the coil of this switch to delay the dropping out of the switch. U1, U2, D1 and D2 are contacts of direction switches for the elevator hoisting motor. Circuits (not shown) are provided for preventing the starting of the car until after the load measurement has been obtained. Contacts on switch LS could be utilized to effect this control.

The inductor is adjusted so that the change in air gap effected from no load to full load in the car provides a maximum change in reluctance of its magnetic path. It is preferred to include a condenser C1 in series with inductor L in leg 1—3 to provide a condition of resonance in this leg 1—3 with no load in the car. The remaining legs of the bridge are then adjusted so that the voltage drop is zero across the diagonal 1—2 of the bridge when the car is empty. As load is taken into the car the air gap of the inductor decreases, decreasing the reluctance of its magnetic circuit, thus increasing the inductance of inductor L. This net increase in inductance creates an unbalance of the bridge to provide a voltage across diagonal 1—2 which increases with increase in load in the car. The voltage applied to potentiometer resistance R6 is adjusted to provide a sufficient margin above the voltage required to fire the tube ET under no load conditions.

In operation, assume that the car door is automatically closed incident to the starting of the car. As the car door reaches closed position, contacts G close completing a circuit for the coil switch M. Switch M engages contacts M1 to prepare the circuit for the coil of switch LS and engages contacts M2 completing a circuit for the tripping coil TR of the notching relay. This results in the notching of the contact arms in a clockwise direction. The arms are moved one step at a time an amount to move brush 41 from one stationary contact 40 to the next. This step by step movement continues until brush 41 reaches a stationary contact where the total voltage applied to trigger TG of the tube is sufficient to fire the tube. As the tube fires the circuit for the coil of switch LS is completed. This switch engages contacts LS1 to establish a self-holding circuit. Contacts LS1 are connected across the tube so that their engagement puts the tube out. Switch LS also separates contacts LS2 which break the circuit for the tripping coil TR. This stops the rotary switch with the contact arms in the positions to which they were last moved.

Upon the opening of the car door when a stop is made contacts G are separated. This breaks the circuit for the coil of switch M which is delayed in dropping out by the discharge of condenser C2 to insure that the stopping of the car is effected. Upon dropping out, switch M separates contacts M1 which break the circuit for the coil of switch LS. It also separates contacts M2. Switch LS in dropping out reengages contacts LS2 to reestablish the circuit for the tripping coil of the notching relay, this circuit extending due to the separation of contacts M2 through brush 44 and the stationary contact for the position to which the brush was moved when the tube fired. This causes renotching of the relay to move the contact arms in a clockwise direction until brush 44 moves off the last contact 43, which breaks the circuit for the tripping coil. In this way the notching relay is returned to neutral position. Upon the next operation of the notching relay brushes 42, 45, 48 and 52 cooperate with the stationary contacts instead of brushes 41, 44, 47 and 51.

The amount of rotary movement of the contact arms in a clockwise direction about their pivots is dependent upon the amount of unbalance of the Wheatstone bridge across the diagonal 1—2 due to the amount of load in the car. With the car empty the greatest amount of rotary movement takes place before sufficient voltage is applied to fire the tube, inasmuch as the voltage across the diagonal 1—2 of the bridge is zero and therefore the firing voltage is due entirely to the output voltage of the potentiometer. As the load in the car increases, the voltage across diagonal 1—2 due to the unbalance of the bridge increases. Since the voltage for firing the tube is a constant and since the voltage causing the firing is a combination of the unbalanced bridge voltage and the potentiometer output voltage, the amount of the output voltage required for firing the tube decreases as the load in the car increases. As a consequence the amount of rotary movement of the notching relay to effect the firing of the tube decreases with the increase in load in the car. Thus for upward travel of the car, under which conditions contacts U1 and U2 are closed, the amount of resistance RU included in circuit with the generator compensating field winding GCF is less, the greater the load in the car. Similarly, for downward travel of the car, under which conditions contacts D1 and D2 are closed, the amount of resistance RD included in circuit with the generator compensating field winding GCF is greater, the greater the load in the car. In other words, during upward car travel the strength of the compensating field is increased for increasing loads in the car and during downward car travel the strength of this field is decreased for increasing loads in the car. Thus, the compensating field winding acts to compensate for variations of load in the car.

While in the circuits illustrated the load measurement is utilized to control the compounding of a variable voltage generator supplying direct current to the elevator hoisting motor, it is to be understood that the load measurement obtained may be utilized for other purposes including controlling the stopping of the car at the landings. Furthermore, while a variable impedance has been illustrated as positioned beneath the platform of an elevator cab supported on resilient means, it is to be understood that the impedance may be positioned at other points, as for example between the platform and car framework in an arrangement in which the cab is secured to the car framework with the platform movable with respect thereto, or between the ends of the hoisting ropes and the car framework. Instead of utilizing an inductor with a variable air gap, an inductor may be utilized in which at least a portion of its ferromagnetic circuit is strained in accordance with the load in the elevator car, an action known as magnetostriction. While a separate resistance R1 is included in leg 1—3 the separate resistance may be omitted and the internal resistance of the inductor utilized as the resistance in this leg. The mechanism may be arranged to decrease the impedance with increase in load in the car instead of increasing the impedance. The connections may be such that the potentiometer output voltage opposes the voltage across bridge diagonal 1—2. Instead of using the potentiometer, other means for obtaining the variable voltage may be employed, as for example, a variable voltage direct current generator. The variable impedance may be utilized in circuits other than the Wheatstone bridge arrangement illustrated to provide response to changes in impedance. The voltage which is dependent on the load in the elevator car and which is combined with a variable voltage may be varied by using as the variable impedance condensive reactance or resistance instead of inductive reactance, or a combination of any of these may be employed. Thus, in the arrangement illustrated, the reactance of condenser C1 may be varied in accordance with variations in load and the inductor L used to provide a condition of resonance with no load in the car. However, the reactance for providing a resonant condition may be omitted although resonance gives a greater voltage range. Also, other mechanism than the notching relay arrangement may be utilized to record the load measurement and instead of utilizing an electronic tube other devices may be employed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an elevator installation; a variable impedance carried by the elevator car; means for varying said impedance by variation in load in the car; a variable resistance; means for supplying current to said impedance and resistance; electroresponsive means operable at a certain voltage; means connecting said electroresponsive means to be subject to a voltage of a value dependent upon the voltage drop across said impedance and that across said resistance; and means for varying said resistance to vary said voltage drop thereacross to cause said certain voltage to be applied to said electroresponsive means regardless of the load in the car.

2. In an elevator installation; a variable reactance carried by the elevator car; means for varying said reactance by variation in load in the car; means for supplying alternating current to said reactance to provide a voltage which varies with said reactance changes; means for providing a variable voltage for combining with said first named voltage; and electroresponsive means subject to said combined voltages.

3. In an elevator installation; a variable reactance carried by the elevator car; means for varying said reactance by variation in load in the car; a potentiometer; means for supplying alternating current to said reactance and potentiometer; and electroresponsive means subject to the voltage drop across said reactance and the voltage drop across a portion of said potentiometer.

4. In an elevator installation; a variable reactance carried by the elevator car; means for varying said reactance by variation in load in the car; a Wheatstone bridge having said reactance connected in one leg thereof; means for applying alternating current voltage across one diagonal of said bridge; a potentiometer; means for applying alternating current input voltage to said potentiometer; means for varying the output voltage of said potentiometer; electroresponsive means; and means connecting said electroresponsive means across the output circuit of said potentiometer and the other diagonal of the bridge in series.

5. In an elevator installation; an inductor having a variable air gap; means mounting said inductor at a point between the platform of the elevator car and the ends of the hoisting ropes supporting the car in such manner as to vary said air gap and thus vary the inductance of said inductor upon increase in load in the car; a Wheatstone bridge having the coil of said inductor connected in one leg thereof; means for applying alternating current voltage across one diagonal of said bridge; a potentiometer; means for applying alternating current input voltage to said potentiometer; means for varying the output voltage of said potentiometer; a three element electron tube; and means connecting the cathode and grid of said tube to be subject to the combination of the voltage of the other diagonal of the bridge and the output voltage of the potentiometer.

6. In an elevator installation; a variable impedance carried by the elevator car; means for varying said impedance by variation in load in the car; a variable resistance; means for supplying current to said impedance and resistance; electroresponsive means operable at a certain voltage; means connecting said electroresponsive means to be subject to a voltage of a value dependent upon the voltage drop across said impedance and that across said resistance; means operable to vary said resistance to vary said voltage drop thereacross to cause said certain voltage to be applied to said electroresponsive means to cause operation thereof; and means responsive to the operation of said electroresponsive means for preventing further operation of said resistance varying means.

7. In an elevator installation; a variable impedance carried by the elevator car; means for varying said impedance by variation in load in the car; means for supplying current to said impedance to provide a voltage which varies with said impedance changes; a potentiometer; means for applying input voltage to said potentiometer; a notching device having a member movable to vary the output voltage of said potentiometer; means for causing energization of said notching device to move said movable member; and means operable upon the combination of the first named voltage and said potentiometer output voltage reaching a certain value for preventing further energization of said notching device, thereby stopping said movable member.

8. In an elevator installation; a variable impedance carried by the elevator car; means for varying said impedance by variation in load in the car; means for supplying current to said impedance to provide a voltage which varies with said impedance changes; a potentiometer; means for applying input voltage to said potentiometer; a notching device having a member movable to vary the output voltage of said potentiometer; means operable prior to the starting of the car for causing energization of said notching device to move said movable member; means operable upon the combination of the first named voltage and said potentiometer output voltage reaching a certain value for preventing further energization of said notching device, thereby stopping said movable member; and means operable upon the car being stopped to reset said notching device.

9. In an elevator installation in which the elevator car is provided with a door; a variable impedance carried by the elevator car; means for varying said impedance by variation in load in the car; means for supplying current to said impedance to provide a voltage which varies with said impedance changes; a potentiometer; means for applying input voltage to said potentiometer; a notching device having a member movable from initial position to vary the output voltage of said potentiometer; means operable upon closing of said door for causing energization of said notching device to move said movable member; a three element electron tube; means connecting the cathode and grid of said tube to be subject to the combination of said first named voltage and said potentiometer output voltage to cause firing of the tube when the voltage applied to the grid reaches a certain value; means responsive to the firing of the tube to deenergize said notching device to prevent further movement of said movable member; and means responsive to opening of said door for causing reenergization of said notching device to move said movable member to said initial position.

10. In an elevator installation in which a hoisting motor is provided for the elevator car and in which the platform of the car is supported on resilient means between the platform and the lower cross structure of the car framework; an inductor having a variable air gap; means mounting said inductor between said platform and cross structure to decrease said air gap and thus increase the inductance of said inductor upon decrease in the distance between said platform and cross structure due to increase in load in the car; a Wheatstone bridge having the coil of said inductor connected in one leg thereof; means for applying alternating current voltage across one diagonal of said bridge; a condenser connected in series with said coil of said one leg for causing a resonant condition with no load in the car, the resistance of the other legs being such as to balance the bridge under such resonant condition; a potentiometer; means for applying alternating current input voltage to said potentiometer; means for varying the output voltage of said potentiometer; a three element electron tube; means connecting the cathode and grid of said tube to be subject to the combination of the voltage of the other diagonal of the bridge and the output voltage of the potentiometer, the polarity of connection being such that said output voltage assists said voltage across said other diagonal of the bridge so as to fire the tube when the combined voltage is a certain amount; and means controlled by said output voltage varying means for controlling the operation of said motor.

11. In an elevator installation in which a direct current hoisting motor is provided for the elevator car and is supplied with current from a variable voltage generator and in which the platform of the car is supported on rubber pads between the platform and the lower cross structure of the car framework; an inductor having a variable air gap; means mounting said inductor between said platform and cross structure to decrease said air gap and thus increase the inductance of said inductor upon decrease in the distance between said platform and cross structure due to increase in load in the car; a Wheatstone bridge having the coil of said inductor connected in one leg thereof; a source of alternating current connected across one diagonal of said bridge; a condenser connected in series with said coil in said one leg for causing a resonant condition with no load in the car, the resistance of the other legs being such as to balance the bridge under such resonant condition; a second source of alternating current; a potentiometer resistance connected across said second source and having one end connected to one end of the other diagonal of the bridge; movable means adapted for connection to said resistance to increase the portion thereof between it and said one end of said other diagonal, the polarity of connection being such that the voltage drop across said portion of said resistance adds to the voltage across said other diagonal of the bridge due to an unbalance of the bridge as a result of an increase in inductance of said inductor; means for causing movement of said movable means; an electron tube having a cold cathode, an anode and a trigger, said cathode and trigger being connected to be subject to the voltage due to any unbalance of the bridge combined with the voltage drop across said portion of said potentiometer resistance so as to fire the tube when the ecombined voltage is a certain amount; means responsive to the firing of said tube for preventing further movement of said movable means; a compensating field winding on said generator; and means responsive to the amount of movement of said movable means for controlling the strength of said field winding to compensate for variations in load in the car.

OTTO ALBERT KRAUER.

REFERENCES CITED

The following references are of record in the file of this patent:

UNITED STATES PATENTS

| Number | Name | Date |
| --- | --- | --- |
| 1,758,605 | Jackson, Jr. | May 13, 1930 |
| 1,924,459 | Rider | Aug. 29, 1933 |
| 2,032,176 | Kovalsky | Feb. 25, 1936 |
| 2,173,289 | Staley | Sept. 19, 1939 |